United States Patent
Mutter et al.

(10) Patent No.: US 11,720,519 B2
(45) Date of Patent: Aug. 8, 2023

(54) USER STATION FOR A SERIAL BUS SYSTEM, AND METHOD FOR TRANSMITTING A MESSAGE IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 237 days.

(21) Appl. No.: 17/287,955

(22) PCT Filed: Oct. 23, 2019

(86) PCT No.: PCT/EP2019/078847
§ 371 (c)(1),
(2) Date: Jun. 7, 2021

(87) PCT Pub. No.: WO2020/089008
PCT Pub. Date: May 7, 2020

(65) Prior Publication Data
US 2021/0406213 A1  Dec. 30, 2021

(30) Foreign Application Priority Data
Oct. 31, 2018 (DE) .................... 10 2018 218 721.5

(51) Int. Cl.
*G06F 13/42* (2006.01)
*G06F 13/36* (2006.01)

(52) U.S. Cl.
CPC .......... *G06F 13/4282* (2013.01); *G06F 13/36* (2013.01)

(58) Field of Classification Search
CPC ..... H04L 12/40; H04L 25/02; H04L 12/4013; H04L 2012/40273; H04L 25/028
See application file for complete search history.

(56) References Cited

U.S. PATENT DOCUMENTS 11,580,050 B2 * 2/2023 Mutter ............... H04L 12/4135
2008/0186870 A1 * 8/2008 Butts ................... H04L 43/0847
370/252

(Continued)

FOREIGN PATENT DOCUMENTS

CN  105915311 A  8/2016
CN  107528680 A  12/2017
(Continued)

OTHER PUBLICATIONS

ISO 11898-1:2015 Standard, 2015, pp. 1-74.
International Search Report for PCT/EP2019/078847 dated Apr. 17, 2020.

*Primary Examiner* — Henry Tsai
*Assistant Examiner* — Christopher A Daley
(74) *Attorney, Agent, or Firm* — Norton Rose Fulbright US LLP; Gerard Messina

(57) ABSTRACT

A user station for a serial bus system and a method for transmitting a message in a serial bus system. The user station includes a communication control device for transmitting messages to a bus of the bus system and/or for receiving messages from the bus of the bus system, and a bit rate switchover unit for switching over a bit rate of the messages from a first bit rate in a first communication phase to a second bit rate for a second communication phase. The bit rate switching unit is designed to switch the bit rate from the first bit rate over to the second bit rate, due to an edge of a predetermined bit sequence that includes one bit of the first communication phase and one bit of the second communication phase.

12 Claims, 3 Drawing Sheets

(56) References Cited

U.S. PATENT DOCUMENTS

| | | | |
|---|---|---|---|
| 2012/0057450 A1* | 3/2012 | Abbas | H04L 49/90 370/216 |
| 2014/0298133 A1* | 10/2014 | Hartwich | H03M 13/09 714/758 |
| 2015/0339254 A1* | 11/2015 | Hartwich | G06F 13/4068 710/106 |
| 2016/0234038 A1* | 8/2016 | Mounier | G06F 13/4022 |
| 2019/0260607 A1* | 8/2019 | Weissenmayer | H04L 12/40071 |
| 2019/0288870 A1* | 9/2019 | de Haas | H04L 12/40032 |
| 2020/0057745 A1* | 2/2020 | Mutter | H04L 12/40143 |
| 2021/0036884 A1* | 2/2021 | Walker | H04L 12/4013 |
| 2021/0406213 A1* | 12/2021 | Mutter | H04L 12/407 |

FOREIGN PATENT DOCUMENTS

| | | |
|---|---|---|
| DE | 102017211860 B3 | 9/2018 |
| EP | 2712123 A1 | 3/2014 |
| EP | 3160090 A1 | 4/2017 |
| EP | 3319274 A1 | 5/2018 |

\* cited by examiner

USER STATION FOR A SERIAL BUS SYSTEM, AND METHOD FOR TRANSMITTING A MESSAGE IN A SERIAL BUS SYSTEM

FIELD

The present invention relates to a user station for a serial bus system, and a method for transmitting a message in a serial bus system, via which a communication in the bus system is selectively possible according to a first communication protocol or a second communication protocol, the communication according to the second communication protocol taking place at a much higher bit rate, and if necessary, with a different physical layer, than with the first communication protocol, so that a specific bit rate switchover is carried out.

BACKGROUND INFORMATION

For the communication between sensors and control units, for example in vehicles, more and more frequently a bus system is used in which data are transferred as messages under the ISO 11898-1:2015 standard, as a CAN protocol specification with CAN FD. The messages are transferred between the user stations of the bus system, such as the sensor, control unit, transducer, etc. In the introduction phase, at the present time in the first step CAN FD is generally used in the vehicle with a data bit rate of 2 Mbit/s for the transfer of bits of the data field, and with an arbitration bit rate of 500 kbit/s for the transfer of bits of the arbitration field.

For the transfer of the arbitration field as well as for the transfer of the data field, the same physical layer is used, which corresponds to the bit transfer layer or layer one of the conventional Open Systems Interconnection (OSI) model. A distinction is made between two bus states, namely, "dominant" (which corresponds to the logical or digital 0) and "recessive" (which corresponds to the logical or digital 1). Since the recessive bus state is not actively driven, the recessive bus state may be overwritten by the dominant bus state, thus making the arbitration possible. However, the recessive bus state is set only relatively slowly by terminating resistors of the bus system. On the one hand this prevents a faster data transfer. However, on the other hand the arbitration according to the above-mentioned ISO 11898-1:2015 standard ensures that only one of the user stations transmits its data exclusively and free of collisions during the transfer of the data field. As a result, data are transferable via the bus more securely after the arbitration, without the need for repetition. Overall, this contributes to an acceleration of the data transfer.

Thus, in order to maintain the advantage of the arbitration while still increasing the transfer rate even further than previously, an approach must be found which mitigates the disadvantages of the slow transfer rate during the arbitration according to the above-mentioned ISO 11898-1:2015 standard.

After the arbitration, if the bit rate is greatly increased compared to the arbitration, for example by more than with CAN FD, data bits cannot compensate for a phase error of arbitration bits when clock pulses with a clock tolerance as with CAN FD are used. As a result, the interoperability of user stations of a bus system with higher data bit rates than with CAN FD are no longer reliably ensured. The existing problems are even further exacerbated if the physical layer is also to be changed in order to allow particularly high bit rates.

SUMMARY

An object of the present invention is to provide a user station for a serial bus system, and a method for transmitting a message in a serial bus system, which solve the above-mentioned problems. In particular, an object of the present invention to provide a user station for a serial bus system, and a method for transmitting a message in a serial bus system in which a high data rate or bit rate and an increase in the quantity of the useful data per frame may be achieved with few sources of error.

The object may by achieved by a user station for a serial bus system in accordance with an example embodiment of the present invention. In accordance with an example embodiment of the present invention, the user station includes a communication control device for transmitting messages to a bus of the bus system and/or for receiving messages from the bus of the bus system, and a bit rate switchover unit for switching over a bit rate of the messages from a first bit rate in a first communication phase to a second bit rate for a second communication phase, the bit rate switchover unit being designed to switch the bit rates from the first bit rate over to the second bit rate, due to an edge of a predetermined bit sequence that includes one bit of the first communication phase and one bit of the second communication phase.

By use of the user station, it is possible in particular to carry out a reliable bit rate switchover from the arbitration phase to the data phase and a reliable bit rate switchover from the data phase to the arbitration phase, even when there is a significant increase in the bit rate in the data phase compared to the arbitration phase. This is also true when in addition, different physical layers are used in the arbitration phase and the data phase.

Thus, in a first communication phase an arbitration provided by CAN may be carried out, and in a second communication phase the transfer rate may still be increased considerably compared to conventional CAN or CAN FD. In particular, a bit rate ratio between the data bit rate and the arbitration bit rate is much higher with a successor of CAN FD, referred to below as CAN NG, than with CAN FD, for example 10 Mbit/s compared to 250 kbit/s=40 times higher. Other arbitrary values of the bit rate ratio are selectable.

In accordance with an example embodiment of the present invention, it is also advantageous that for the switchover of the bit rates, only a very short bit sequence, namely, only two bits or up to four bits, is required. This results in only a very low data overhead, so that the speed of the communication between user stations of the bus system is only minimally affected.

In accordance with an example embodiment of the present invention, an additional advantage is that the bit rate switchover is independent of the sampling positions of the user stations. This results in greater robustness and fewer error sources in the application.

In accordance with an example embodiment of the present invention, the method carried out by the user station also takes into account that for the duration of the data phase, it may be necessary to switch the physical layer from the physical layer in the arbitration phase over to a different physical layer. It is possible, if necessary, to also operate user stations in the bus system that carry out no switchover of the physical layer between the arbitration phase and the data phase. A seamless migration path from CAN FD toward CAN NG is thus possible.

Individual user stations of the bus system may thus be upgraded to the user station described above, even if the remaining user stations of the bus system continue to use CAN or CAN FD. Therefore, no gateways between a CAN FD bus system and a successor bus system are necessary.

Advantageous further embodiments of the user station of the present invention are disclosed herein.

According to a first option of the present invention, the communication control device is designed to transmit and/or to receive bits of the message at a lower bit rate in the first communication phase than in the second communication phase, in the first communication phase between the user stations of the bus system, it being negotiated which of the user stations in the subsequent second communication phase has, at least temporarily, exclusive, collision-free access to the bus of the bus system.

According to a second option of the present invention, the communication control device is designed to transmit and/or to receive bits of the message at a lower bit rate in the second communication phase than in the first communication phase, in the second communication phase between the user stations of the bus system, it being negotiated which of the user stations in a subsequent first communication phase has, at least temporarily, exclusive, collision-free access to the bus of the bus system.

In accordance with an example embodiment of the present invention, the bit rate switchover unit is possibly designed to append, in the predetermined bit sequence, a buffer time to the bit of the first communication phase or the bit of the second communication phase, a transceiver device of the user station being designed to generate a first bus state for a first digital data state of the messages, and to generate a second bus state for the second digital data state of the messages, at the first bit rate in such a way that the second bus state can overwrite the first bus state, and the transceiver device, for transmitting at the second bit rate, being designed to generate different bus states in such a way that the bus states for the different digital data states of the messages cannot overwrite one another.

It is possible for the bit rate switchover unit to be designed, during the switch from the first bit rate over to the second bit rate, to also switch over the physical layer for transmitting the messages.

The physical layer in the predetermined bit sequence may be switched over in an area of the bit that is transmitted in the first communication phase, or the physical layer in the predetermined bit sequence may be switched over in an area of the bit that is transmitted in the second communication phase.

According to one exemplary embodiment of the present invention, the area in part includes a buffer time by which the bit, which is transmitted in the first communication phase or the second communication phase, is extended.

The physical layer in the predetermined bit sequence is possibly switched over at a sampling point of the bit that is transmitted in the first communication phase.

When the user station acts only as a receiver of the messages, the user station is preferably designed to carry out a hard synchronization at the edge of the predetermined bit sequence, as the result of which all phase errors that are possibly present concerning the bit stream of the user station, which has the exclusive, collision-free access to the bus of the bus system, are corrected.

At least two of the user stations described above may be part of a bus system which also includes a bus, so that the at least two user stations are connected to one another via the bus in such a way that they may communicate serially with one another. At least one of the at least two user stations is a user station described above.

Moreover, the object stated above is achieved by a method for transmitting a message in a serial bus system according to an example embodiment of the present invention. In accordance with an example embodiment of the present invention, the method includes the steps: transmitting, via a communication control device, messages to a bus of the bus system and/or receiving, via the communication control device, messages from the bus of the bus system, and switching over, via a bit rate switchover unit, a bit rate of the messages from a first bit rate in a first communication phase to a second bit rate for a second communication phase, the bit rate switchover unit switching the bit rate from the first bit rate over to the second bit rate, due to an edge of a predetermined bit sequence that includes one bit of the first communication phase and one bit of the second communication phase.

The method yields the same advantages as stated above with regard to the user station.

Further possible implementations of the present invention also include combinations, even if not explicitly stated, of features or specific embodiments described above or discussed below with regard to the exemplary embodiments. Those skilled in the art will also add individual aspects as enhancements or supplements to the particular basic form of the present invention, in view of the disclosure herein.

BRIEF DESCRIPTION OF THE DRAWINGS

The present invention is described in greater detail below with reference to the figures, and based on exemplary embodiments.

Unless stated otherwise, identical or functionally equivalent elements are provided with the same reference numerals in the figures.

DETAILED DESCRIPTION OF EXAMPLE EMBODIMENTS

Figure 1:
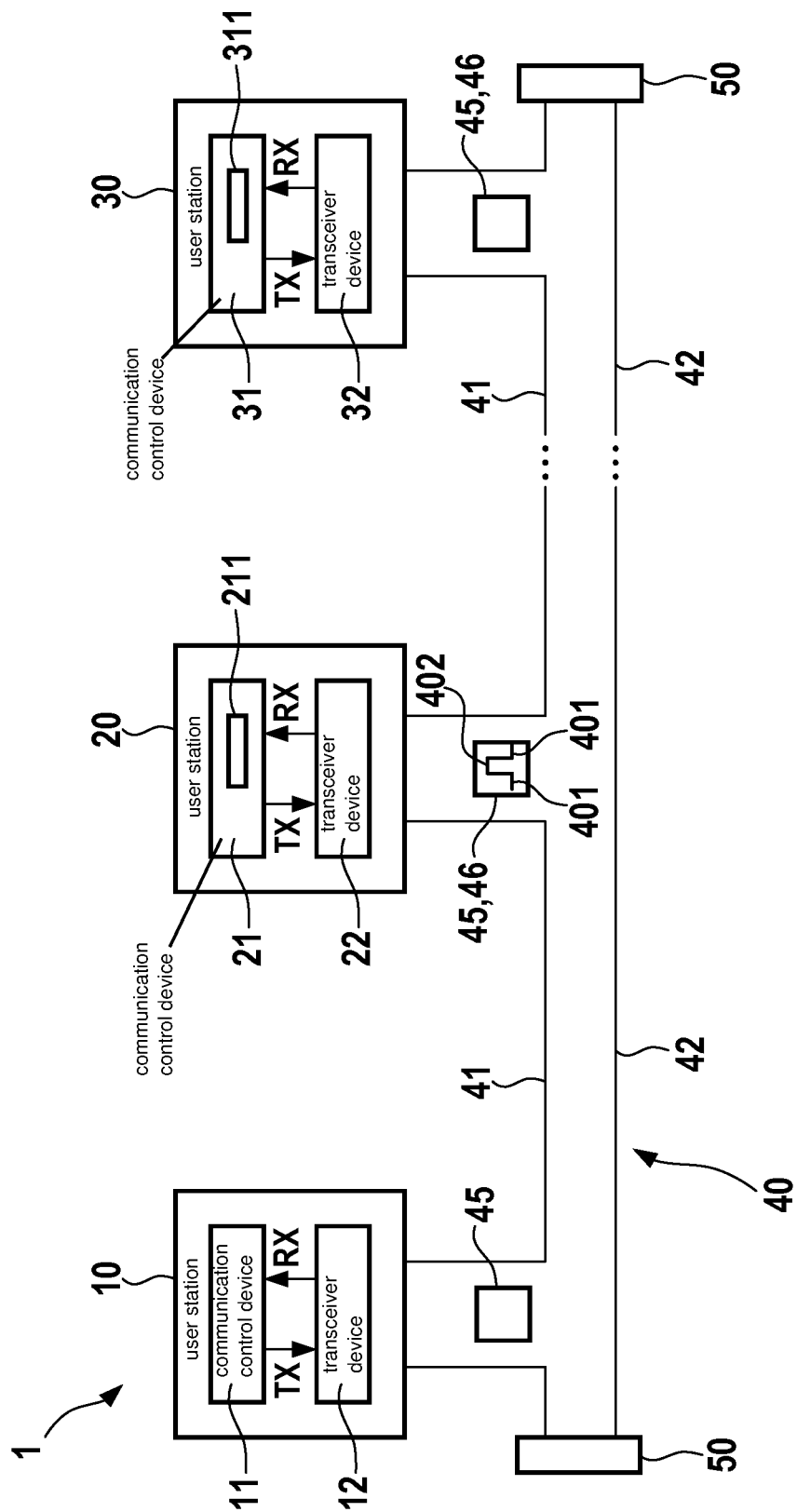
FIG. 1 shows a simplified block diagram of a bus system according to a first exemplary embodiment of the present invention.

FIG. 1 shows as an example a bus system 1 that is in particular the basis for a conventional CAN bus system, a CAN FD bus system, a CAN FD successor bus system, also referred to as a CAN NG bus system, and/or modifications thereof, as described below. Bus system 1 may be used in a vehicle, in particular a motor vehicle, an aircraft, etc., or in a hospital, and so forth.

In FIG. 1, bus system 1 includes a plurality of user stations 10, 20, 30, each of which is connected to a first bus wire 41 and a second bus wire 42 at a bus 40. Bus 40 at both of its ends is closed off via terminating resistors 50. Bus wires 41, 42 may also be referred to as CAN_H and CAN_L and, using a TX signal in the transmission state, are used for electrical signal transfer after coupling in the dominant levels or states 401, or generating or actively driving recessive levels or states 402. States 401, 402 are shown in a highly schematic manner only for user station 20. States 401, 402 correspond to the states of a TX signal of a transmitting user station 10, 20, 30. After signals CAN_H and CAN_L are transferred on bus wires 41, 42, the signals are received by user stations 10, 20, 30 as an RX signal. Via bus 40, messages 45, 46 in the form of signals CAN_H and CAN_L are serially transferable between individual user stations 10, 20, 30. User stations 10, 20, 30 are, for example, control units, sensors, display devices, etc., of a motor vehicle.

As shown in FIG. 1, user station 10 includes a communication control device 11 and a transceiver device 12. In contrast, user station 20 includes a communication control device 21 that includes a bit rate switchover unit 211, and a transceiver device 22. User station 30 includes a communication control device 31 that includes a bit rate switchover unit 311, and a transceiver device 32. Transceiver devices 12, 22, 32 of user stations 10, 20, 30 are each directly connected to bus 40, although this is not illustrated in FIG. 1.

Communication control devices 11, 21, 31 are each used for controlling a communication of particular user station 10, 20, 30 via bus 40 with one or multiple other user stations of user stations 10, 20, 30 connected to bus 40.

Communication control device 11 may be designed as a conventional CAN or CAN FD controller. Communication control device 11 creates and reads first messages 45, which are conventional CAN messages or CAN FD messages, for example. Conventional CAN messages are built up according to the conventional base format, in which a number of up to 8 data bytes may be included in first message 45. The CAN FD message is built up according to the CAN FD format, in which a number of up to 64 data bytes may be included, which are transferred at a much faster, and thus higher, data rate than for the conventional CAN message. Transceiver device 12 may be designed as a conventional CAN transceiver and/or CAN FD transceiver.

Each of communication control devices 21, 31 creates and reads first messages 45, as described above, or second messages 46. Second messages 46 are built up based on a CAN NG format, described in greater detail below. Each of transceiver devices 22, 32 may be designed as a CAN transceiver which may provide one of first messages 45 described above or a second message 46 according to the CAN NG format for associated communication control device 21, 31 or receive it from same, as needed.

Formation and then transfer of messages 46 having the CAN NG format, and also the reception of such messages 46, are achievable by use of the two user stations 20, 30.

Figure 2:
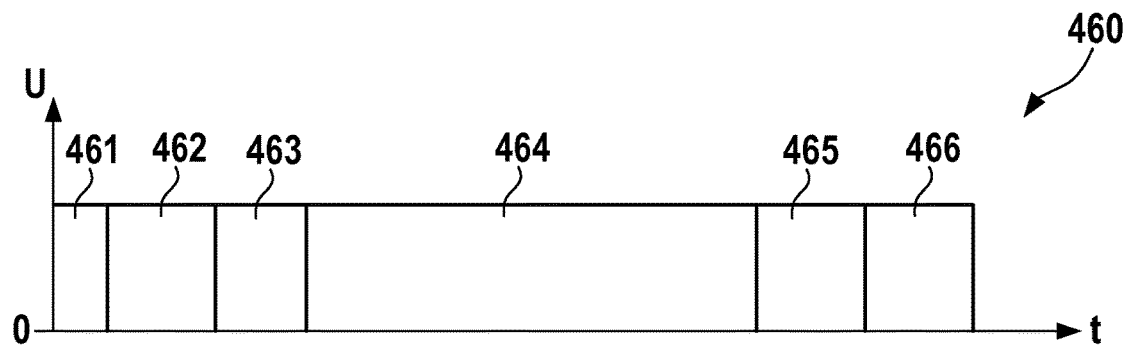
FIG. 2 shows a diagram for illustrating the design of messages that may be transmitted from user stations of the bus system according to the first exemplary embodiment of the present invention

FIG. 2 shows for message 46 a CAN NG frame 460, which is transmitted from transceiver device 22 or transceiver device 32 onto bus 40 as a difference signal due to a TX signal or is received from bus 40, from which the RX signal is generated. CAN NG frame 460 is divided into different fields for the CAN communication on bus 40, namely, a start field 461, an arbitration field 462, a control field 463, a data field 464, a check sum field 465, and an end field 466. Except for the differences of control field 463 described below, a frame for first message 45 is built up in the same way as frame 460.

Start field 461 includes one bit, for example, also referred to as an SOF bit, and indicates the start of frame. Arbitration field 462 contains an identifier including 32 bits, for example, for identifying the sender of the message. Arbitration field 462 may additionally contain a piece of protocol format information made up of one or multiple bits, which is suitable for distinguishing CAN NG frames from CAN frames or CAN FD frames. However, the following description assumes that the CAN NG frame (second message 46) is identical to the frame format for CAN FD (first message 45) except for the FDF bit.

Control field 463 contains a data length code that is 13 bits long, for example, which may assume values from 1 to 4096 with an increment of 1, or alternatively, values from 0 to 4095. The data length code may alternatively include fewer or more bits, and the value range and the increment may assume other values. Control field 463 additionally includes a piece of protocol format information made up of one or multiple bits, which is suitable for distinguishing CAN NG frames from CAN frames or CAN FD frames.

Data field 464 contains the useful data of the CAN NG frame or of message 46. The useful data may include up to 64 bytes or 4096 bytes, for example, or some other arbitrary number of bytes, corresponding to the value range of the data length code. Check sum field 465 contains a check sum concerning the data in data field 464, including the stuff bits, which are inserted by the sender of message 46 as inverse bits after every 5 or 10 identical bits, for example. End field 466 contains at least one acknowledge bit and also a sequence of 11 identical bits that indicate the end of CAN NG frame 460. The at least one acknowledge bit may be used to communicate whether or not a receiver has discovered an error in received CAN NG frame 460 or message 46.

A physical layer, similarly as with CAN and CAN FD, is used in the phases for transmitting arbitration field 462 and end field 466. An important point during these phases is that the conventional CSMA/CR method is used, which allows simultaneous access of user stations 10, 20, 30 to bus 40 without destroying higher-priority message 45, 46. It is thus possible to add further bus user stations 10, 20, 30 to bus system 1 in a relatively simple manner, and the communication bandwidth is utilized very efficiently, which is very advantageous.

Consequently, the CSMA/CR method must provide so-called recessive states 402 on bus 40, which may be overwritten by other user stations 10, 20, 30 with dominant states 401 on bus 40. In recessive state 402, high-impedance conditions prevail at individual user station 10, 20, 30, which in combination with the parasites of the bus wiring result in longer time constants. This results in a limitation of the maximum bit rate of the present-day CAN FD physical layer to approximately 2 megabits per second at the present time during actual vehicle use.

Control field 463 and data field 464 are transmitted by a sender of message 46 onto bus 40 only after user station 20 or user station 30, as the sender, has won the arbitration, and user station 20, as the sender for transmitting fields 463 through 466, thus has exclusive access to bus 40 of bus system 1. During the arbitration, with the aid of the identifier in arbitration field 462, bit-by-bit negotiation is carried out between user stations 10, 20, 30 concerning which user station 10, 20, 30 would like to transmit message 45, 46 having the highest priority, and therefore for the next time period for transmitting fields 463 through 465, obtains exclusive access to bus 40 of bus system 1.

The arbitration at the start of a frame 460 or of message 45, 46, and the acknowledgment in end field 466 at the end of frame 460 or of message 45, 46, is possible only when the bit time is much more than twice as long as the signal propagation time between two arbitrary user stations 10, 20, 30 of bus system 1. Therefore, the bit rate in the arbitration phase during transfer of fields 461, 462, and 466 is selected to be slower, and thus lower, than in the other fields of frame 460. In particular, the bit rate in the arbitration phase is selected as 500 kbit/s, resulting in a bit time of approximately 2 µs, whereas the bit rate in the other communication phase(s) is selected, for example, as 5 to 8 Mbit/s or greater, resulting in a bit time of approximately 0.2 µs and less. The bit time of the signal in the arbitration phase is thus greater than the bit time of the signal in the other communication phase(s) by, for example, a factor of 4 or 10 or 40 or more, etc. The factor for the bit time is arbitrarily selectable.

Each of user stations 10, 20, 30 may transmit and receive CAN FD frames, but user station 10 cannot transmit or receive CAN NG frames 460. For example, if user station 20 transmits a CAN NG frame 460, CAN FD user station 10 goes into the protocol exception state and thus ignores CAN NG frame 460 of user station 20. For CAN NG message 46 a new, alternative frame format, namely, frame 460, is used. In this frame format, a switchover is made from the conventional CAN or CAN FD frame format to the CAN NG frame format. The frame formats of CAN FD and CAN NG are the same except for the first res bit. Thus, user stations 20, 30 each also support CAN FD.

Figure 3:
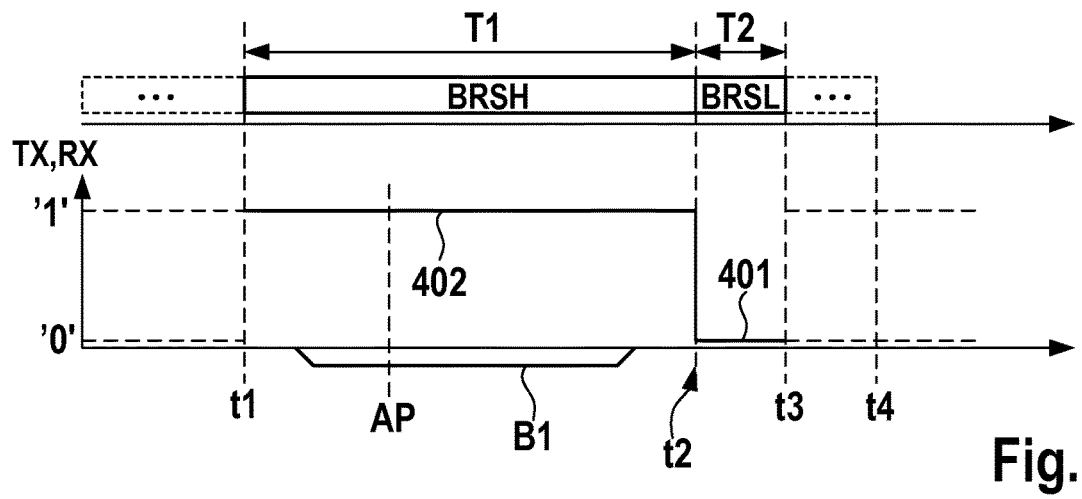
FIG. 3 shows a diagram for illustrating the temporal sequence of a bit rate switchover during the transition from the arbitration phase to the data phase according to the first exemplary embodiment of the present invention

FIG. 3 illustrates the function of bit rate switchover devices 211, 311, which carry out a switchover of the bit rate of frame 460 during a transition from the arbitration phase to the data phase. The upper portion of FIG. 3 shows a process over time t for a bit sequence of bits BRSH, BRSL, etc., and the lower portion of FIG. 3 shows a process over time t for a transmission signal TX that results from the stated bit sequence, and a reception signal RX that results therefrom. The bits preceding and following the bit rate switchover are illustrated in dashed lines, since these bits have no importance for the bit rate switchover and may have arbitrary values.

The BRSH bit is a recessive bit 402 and has the logical value 1. The BRSL bit is a dominant bit 402 and has the logical value 0. The bit sequence of bits BRSH, BRSL thus logically forms a bit sequence 10.

The BRSH bit is sampled by communication control devices 21, 31 at a sampling point AP in order to form the RX signal. The BRSH bit is an arbitration bit having an arbitration bit time T1. The BRSL bit is a data bit having a data bit time T2. Bit time T1 is temporally much longer than bit time T2.

The BRSH bit begins at point in time t1 and ends at point in time t2. The BRSL bit begins at point in time t2 and ends at point in time t3. These are followed by further data bits, each having a data bit time T2. This is illustrated only at a point in time t4 that is later than point in time t3 by data bit time T2. The bit rate switchover or the switch of bit time T1 over to bit time T2 thus takes place at point in time t2.

At the edge between bits BRSH and BRSL, i.e., at point in time t2, all RX user stations carry out a so-called hard synchronization, as the result of which all phase errors that are possibly present concerning the bit stream of the TX user station are corrected. RX user stations are all user stations of bus system 1 that act only as a receiver in the present cycle for transmitting a frame 460. In contrast, the TX user station is the user station which acts as a sender in the present cycle, but which for control also receives the TX signal, which it transmits onto the bus as an RX signal from bus 40.

In the present example, bit rate switchover device 211, 311 of TX user station 20, 30 and bit rate switchover device 211, 311 of RX user station(s) 20, 30 also carry out a switchover of the physical layer within the BRSH bit, and in particular more precisely, in an area B1. The switchover of the physical layer is to take place at the right time so that transceiver device 22, 32 of the TX user station has completed the switchover of the physical layer prior to the end of the BRSH bit, and drives the BRSH bit corresponding to the new physical layer, at least for a brief period. The TX user station may then drive the BRSL bit with the new physical layer. This means that, depending on how much time the switchover of the physical layer requires, the switchover of the physical layer in transceiver device 22, 32 of the TX user station may begin earlier or later within the BRSH bits. According to one particular example, the switchover of the physical layer may begin at sampling point AP of the BRSH bit. However, according to the principles stated above, the switchover of the physical layer may begin at some other arbitrary point in time. The fact that the physical layer is to be switched over is recognized by transceiver device 22, 32 itself, or communication control device 21, 31 signals, for example via two signals:

For RX and TX user stations 20, 30, signal "Phy_switch" indicates that the other physical layer in transceiver device 21, 31 is to be used. This may be necessary in order to adapt reception thresholds to transceiver device 21, 31. Transceiver device 21, 31 does not detect a signal until a predetermined reception threshold is exceeded. The predetermined reception threshold is adapted or set to the physical layer to be used.

For TX user station 20, 30, signal "TX_enable" indicates that bus 40 is to be actively driven.

Depending on how different the two physical layers are, signal TX_enable is also possibly sufficient, for example because no reception thresholds have to be adapted on the reception side.

The switchover from the data phase back to the arbitration phase is less critical than the above-described switchover at the start of the data phase. The reason is that an arbitration bit is long and a phase error is of lesser importance. For the switchover from the data phase back to the arbitration phase, bit rate switchover devices 211, 311 may use the same variant as described above for the switchover at the start of the data phase. However, the significant difference is that in the switchover from the data phase back to the arbitration phase, prior to the bit rate switchover the transfer is carried out at the higher data phase bit rate, and after the bit rate switchover the transfer is carried out at the slower, and thus lower, arbitration bit rate. Alternatively, however, variants for switching over from the data phase back to the arbitration phase may be used, as described below.

Figure 4:
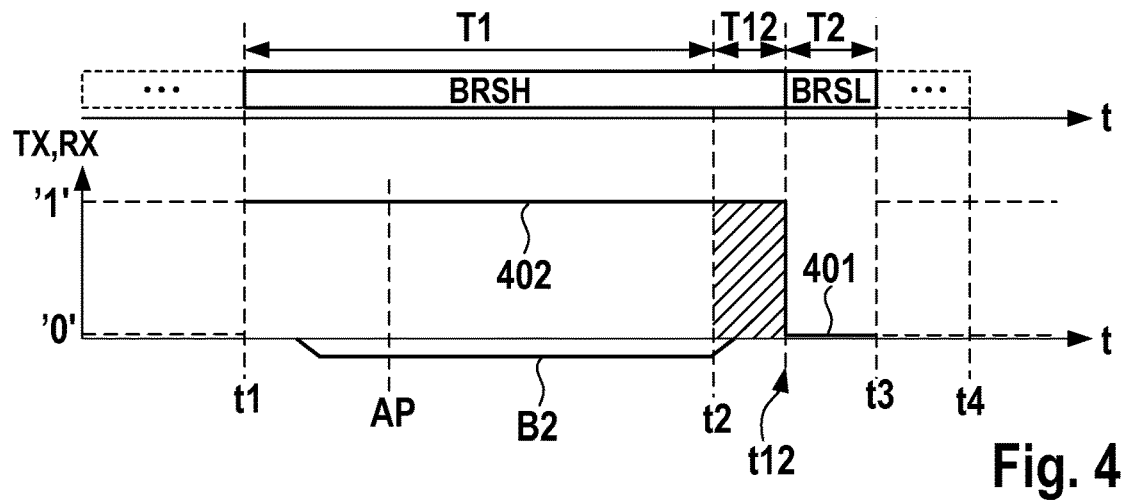
FIG. 4 shows a diagram for illustrating the temporal sequence of a bit rate switchover during the transition from the arbitration phase to the data phase according to a second exemplary embodiment of the present invention

FIG. 4 illustrates the function of bit rate switchover devices 211, 311 according to a second exemplary embodiment, with reference to a switchover of the bit rate of frame 460 for a transition from the arbitration phase to the data phase. In contrast to the variant from FIG. 3, a buffer time T12 is inserted between the BRSH bit and the BRSL bit. Thus, not only does the BRSH bit last up to point in time t2, but it is also extended by buffer time T12 to a point in time t12. Only then is the BRSL bit appended. The BRSL bit thus begins at point in time t12 and ends at point in time t3. As a result, the area for switching the physical layer over to an area B2 is also extended. Area B2 thus includes area B1, and buffer time T12 in part.

The particular variant from FIG. 4 is advantageous when the switchover of the physical layer is to be carried out in transceiver device 22, 32, but the switchover has not concluded at the end of the nominal BRSH bit. This may be due to the fact that, for example, the switchover of the physical layer lasts longer than an arbitration bit, i.e., longer than the time period or bit time T1, or the switchover of the physical layer has been started only late within the BRSH bit. The BRSH bit is thus extended by buffer time T12 and ensures that the switchover of the physical layer is completed at the right time prior to the end of the extended BRSH bit.

Buffer time T12 is known to the TX user station, for example by configuration.

During operation, the TX user station extends the BRSH bit by buffer time T12. The TX user station subsequently transmits the BRSL bit. The RX user station(s) wait(s) for the edge from 1 to 0 at the end of the BRSH bit, and only then switch(es) with this edge into the data phase, i.e., at point in time t12. For the RX user station(s), the BRSH bit ends and the BRSL bit begins at the edge from 1 to 0 at point in time t12. In principle, the RX user station(s) do(es) not require knowledge of the duration of buffer time T12.

Figure 5:
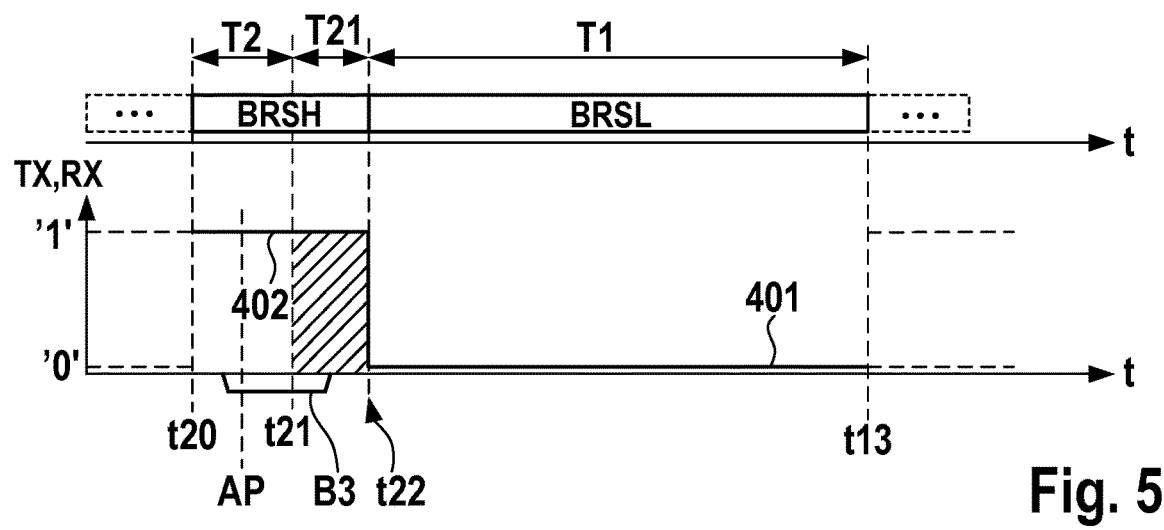
FIG. 5 shows a diagram for illustrating the temporal sequence of a bit rate switchover during the transition from the data phase to the arbitration phase according to the second exemplary embodiment of the present invention.

FIG. 5 shows the switchover from the data phase back to the arbitration phase for the present exemplary embodiment, in which bit rate switchover devices 211, 311 use the corresponding variant from FIG. 4 for this purpose. Thus, after the start of the BRSH bit at point in time t20, RX user station(s) wait(s) for the edge from 1 to 0 at the end of the BRSH bit, and only then switch(es) with this edge into the arbitration phase, i.e., at point in time t22. For the RX user station(s), the BRSH bit ends and the BRSL bit begins at the edge from 1 to 0 at point in time t22. The BRSH bit, which actually ends at point in time t21, is thus extended by buffer time T21. As a result, the area for switching the physical layer over to an area B3 is also extended. Area B3 includes a portion of bit time T2 of the BRSH data bit, and buffer time T21 in part. In principle, the RX user station(s) do(es) not require knowledge of the duration of buffer time T21.

The optional switchover of the physical layer takes place in an area B2. In particular, the switchover of the physical layer may take place at the sampling point of the BRSH bit.

The described variant from FIG. 5 is suitable in particular when the time it takes for at least one of transceiver devices 20, 30 to switch over the physical layer is longer than a bit time in the data phase.

Figure 6:
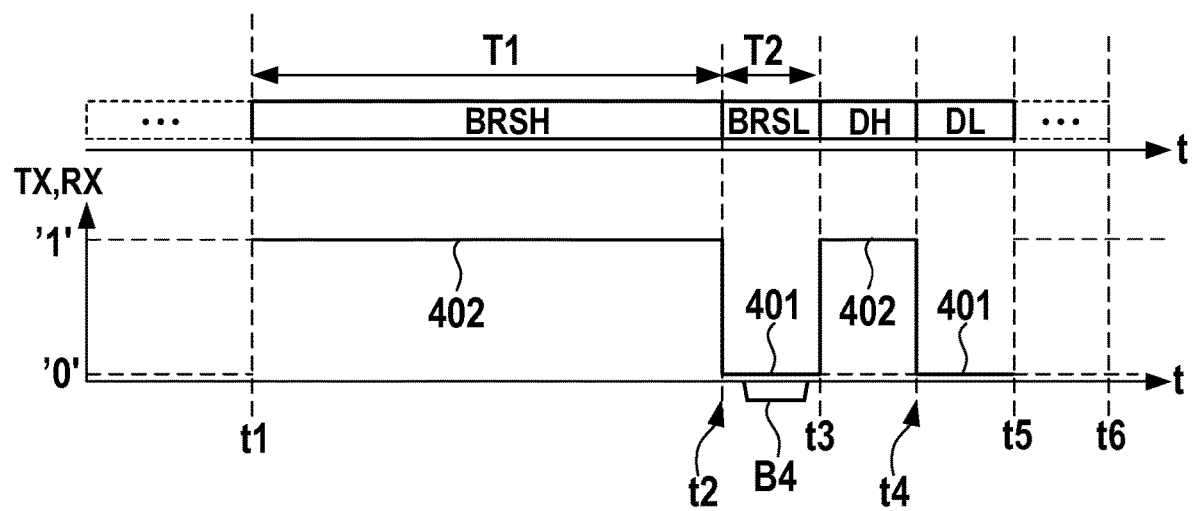
FIG. 6 shows a diagram for illustrating the temporal sequence of a bit rate switchover during the transition from the arbitration phase to the data phase according to a third exemplary embodiment of the present invention.

FIG. 6 illustrates the function of bit rate switchover devices 211, 311 according to a third exemplary embodiment, with reference to a switchover of the bit rate of frame 460 during a transition from the arbitration phase to the data phase.

In contrast to the variant from FIG. 3 or the first exemplary embodiment, in the present exemplary embodiment the optional switchover of the physical layer for the bit rate switchover takes place within the BRSL bit, i.e., at a different bus level than with the variant from FIG. 3. The optional switchover of the physical layer may thus take place in an area B4 situated within bit time T2 of BRSL bit. Depending on the physical layer used, it may be more advantageous to carry out the switchover of the physical layer during the dominant bus level of the arbitration phase.

In the present exemplary embodiment, the edge from the BRSH bit to the BRSL bit, i.e., the 10 edge, is still driven with the physical layer of the arbitration phase. The edge steepness of a 10 edge including the physical layer of the arbitration phase and the edge steepness of a 10 edge including with the physical layer of the data phase may be quite different.

A new synchronization may optionally be carried out on an edge of a bit of the new physical layer in order to make the bit rate switchover more robust. Bits DH=1 and DL=0 are transmitted subsequent to the BRSL bit for this purpose. The RX user station(s) may now synchronize to DH-DL edge 10. If the physical layer in the data phase drives both bus states, i.e., dominant 401 and recessive 402, as expected, the RX user station(s) may additionally and optionally synchronize actually to BRSL DH edge 10, i.e., at point in time t3.

The synchronization of the RX user station(s) may be a resynchronization, in which only a portion of the phase errors are eliminated, or a hard synchronization. However, the preferred approach is a hard synchronization in the RX user station(s) at the DH-DL edge, i.e., at point in time t4, since this approach is more robust and also easy to understand.

Thus, one arbitration bit BRSH and three data bits BRSL, DH, DL are necessary for the described variant of the bit rate switchover in the present exemplary embodiment. Since data bits BRSL, DH, DL have a much shorter bit time than arbitration bit BRSH, the data overhead thus produced is very low.

In the present variant, it must be noted that the switchover of the physical layer is to be completed within the BRSL bit. If bit time T2 of BRSL bit is not sufficient, the BRSL bit may optionally be extended by a buffer time T12 if necessary.

For the switchover from the data phase back to the arbitration phase, bit rate switchover devices 211, 311 may use the same variant as described above for the switchover at the start of the data phase. Alternatively, however, variants for switching over from the data phase back to the arbitration phase, described for the preceding exemplary embodiments for the switchover from the data phase to the arbitration phase or for the switchover from the arbitration phase to the data phase, may be used.

In general, in the bus system with CAN NG, in comparison to CAN or CAN FD the following deviant properties may be achieved:
a) acquiring and optionally adapting proven properties that are responsible for the robustness and user-friendliness of CAN and CAN FD, in particular a frame structure including identifiers and arbitration according to the CSMA/CR method,
b) a substantial increase in the net data transfer rate,
c) For transmitting data field 464, i.e., in the data phase, CAN NG uses a different physical layer than does CAN FD, for example a physical layer in which both bus states are actively driven, and error frames (error flags) are not provided during data phase 468. With such a physical layer for CAN NG, much higher bit rates may be achieved than with CAN FD.

All of the above-described embodiments of communication control devices 21, 31, of transceiver devices 22, 32, of bit rate switchover units 211, 311, of user stations 20, 30, of bus system 1, and of the method carried out therein may be used alone or in any possible combination. In particular, all features of the above-described exemplary embodiments and/or modifications thereof may be arbitrarily combined. Additionally or alternatively, in particular the following modifications are possible.

Above-described bus system 1 according to the exemplary embodiments is described with reference to a bus system based on the CAN protocol. However, bus system 1 according to the exemplary embodiments may also be some other type of communications network in which data are serially transferable at two different bit rates. It is advantageous, but not a mandatory requirement, that in bus system 1, exclusive, collision-free access of a user station 10, 20, 30 to a shared channel is ensured, at least for certain time periods.

The number and arrangement of user stations 10, 20, 30 in bus system 1 of the exemplary embodiments is arbitrary. In particular, user station 10 in bus system 1 may be dispensed with. It is possible for one or multiple of user stations 20 or 30 to be present in bus system 1.

At least one of bit rate switchover units 211, 311 is possibly situated externally from communication control device 21, 31. In particular, at least one of bit rate switchover units 211, 311 is provided as a separate unit of user station 20, 30.

What is claimed is:

1. A user station for a serial bus system, comprising:
   a communication control device to transmit messages to a bus of the bus system and/or to receive messages from the bus of the bus system; and
   a bit rate switchover unit to switch over a bit rate of the messages from a first bit rate in a first communication phase to a second bit rate for a second communication phase, the bit rate switchover unit being configured to switch the bit rate from the first bit rate over to the second bit rate, due to an edge of a predetermined bit sequence that includes one bit of the first communication phase and one bit of the second communication phase.

2. The user station as recited in claim 1, wherein the communication control device is configured to transmit and/or to receive bits of the messages at a lower bit rate in the first communication phase than in the second communication phase, and in the first communication phase, it being negotiated, between user stations of the bus system, which of the user stations in a subsequent second communication phase has, at least temporarily, exclusive, collision-free access to the bus of the bus system.

3. The user station as recited in claim 1, wherein for transmitting at the first bit rate, a transceiver device of the user station is configured to generate a first bus state for a first digital data state of the messages, and to generate a second bus state for a second digital data state of the messages, so that the second bus state can overwrite the first bus state, and the transceiver device, for transmitting at the second bit rate, is configured to generate different bus states so that the bus states for different digital data states of the messages cannot overwrite one another.

4. The user station as recited in claim 1, wherein the communication control device is configured to transmit and/or to receive bits of the messages at a lower bit rate in the second communication phase than in the first communication phase, and in the second communication phase between user stations of the bus system, it being negotiated which of the user stations in a subsequent first communication phase has, at least temporarily, exclusive, collision-free access to the bus of the bus system.

5. The user station as recited in claim 1, wherein the bit rate switchover unit is configured to append, in the predetermined bit sequence, a buffer time to the bit of the first communication phase or the bit of the second communication phase.

6. The user station as recited in claim 1, wherein the bit rate switchover unit is configured to, during the switch from the first bit rate over to the second bit rate, also switch over a physical layer for transmitting the messages.

7. The user station as recited in claim 6, wherein the physical layer in the predetermined bit sequence is switched over in an area of the bit that is transmitted in the first communication phase, or the physical layer in the predetermined bit sequence is switched over in an area of the bit that is transmitted in the second communication phase.

8. The user station as recited in claim 7, wherein the area in part includes a buffer time by which the bit, which is transmitted in the first communication phase or the second communication phase, is extended.

9. The user station as recited in claim 6, wherein the physical layer in the predetermined bit sequence is switched over at a sampling point of the bit that is transmitted in the first communication phase.

10. The user station as recited in claim 1, wherein when the user acts only as a receiver of the messages, the user station is configured to carry out a hard synchronization at the edge of the predetermined bit sequence, as a result of which all phase errors that are possibly present concerning a bit stream of a transmitting user station are corrected.

11. A bus system, comprising:
    a bus; and
    at least two user stations that are connected to one another via the bus so that they may communicate serially with one another, and of which at least one user station includes:
      a communication control device to transmit messages to the bus of the bus system and/or to receive messages from the bus of the bus system, and
      a bit rate switchover unit to switch over a bit rate of the messages from a first bit rate in a first communication phase to a second bit rate for a second communication phase, the bit rate switchover unit being to switch the bit rate from the first bit rate over to the second bit rate, due to an edge of a predetermined bit sequence that includes one bit of the first communication phase and one bit of the second communication phase.

12. A method for transmitting a message in a serial bus system, the method comprising:
    transmitting, via a communication control device, messages to a bus of the bus system and/or receiving, via the communication control device, messages from the bus of the bus system; and
    switching over, via a bit rate switchover unit, a bit rate of the messages from a first bit rate in a first communication phase to a second bit rate for a second communication phase, the bit rate switchover unit switching the bit rate from the first bit rate over to the second bit rate, due to an edge of a predetermined bit sequence that includes one bit of the first communication phase and one bit of the second communication phase.

* * * * *